United States Patent [19]

Göhre et al.

[11] Patent Number: 5,444,975
[45] Date of Patent: Aug. 29, 1995

[54] METHOD AND ARRANGEMENT FOR CONTROLLING THE SUPPLY OF SECONDARY AIR FOR AN INTERNAL COMBUSTION ENGINE

[75] Inventors: Jochen Göhre, Karlsruhe; Winfried Moser, Ludwigsburg, both of Germany

[73] Assignee: Robert Bosch GmbH, Stuttgart, Germany

[21] Appl. No.: 218,342

[22] Filed: Mar. 25, 1994

[30] Foreign Application Priority Data

Mar. 26, 1993 [DE] Germany .................. 43 09 854.1

[51] Int. Cl.⁶ ............................................ F01N 3/22
[52] U.S. Cl. .............................. 60/274; 60/284; 60/289
[58] Field of Search ............... 60/274, 284, 300, 289

[56] References Cited

U.S. PATENT DOCUMENTS

| | | | |
|---|---|---|---|
| 3,503,716 | 3/1970 | Berger | 60/284 |
| 3,775,064 | 11/1973 | Berger | 60/300 |
| 3,779,015 | 12/1973 | Maruoka | 60/300 |

OTHER PUBLICATIONS

"The Emission Control System of the New 300 SI-24 and 500 SL—Structure and Function" by W. Zahn et al, Motortechnische Zeitschrift 50 (1989), vol. 6, pp. 247 to 254 (no translation).

*Primary Examiner*—Douglas Hart
*Attorney, Agent, or Firm*—Walter Ottesen

[57] ABSTRACT

The invention is directed to a method and an arrangement for controlling the supply of secondary air to the exhaust gas of an internal combustion engine. A method for diagnosing this arrangement is also provided. The arrangement includes an electrically operated secondary air pump which can be operated in at least two stages in dependence upon operating parameters of the engine. In this way, the supply of secondary air can be finely adapted to the actual value of the exhaust gas quantity supplied by the engine. This fine adaptation is determined by the number of stages. Resistors are switched into the current supply of the secondary air pump for the drive which has at least two stages.

8 Claims, 4 Drawing Sheets

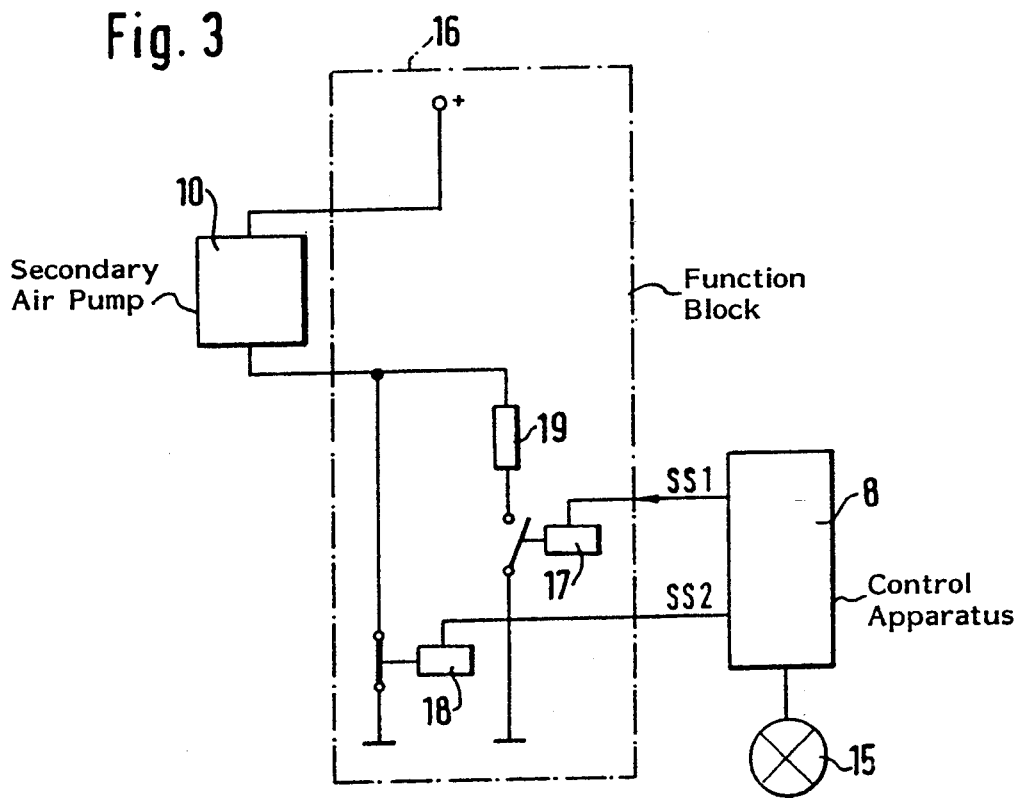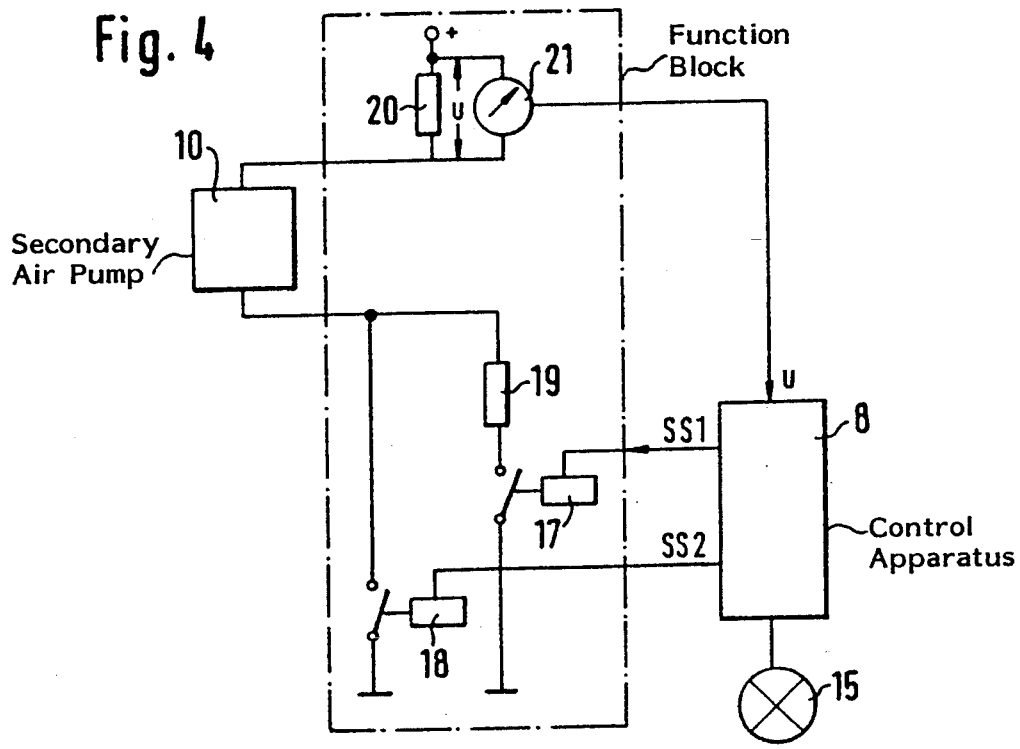

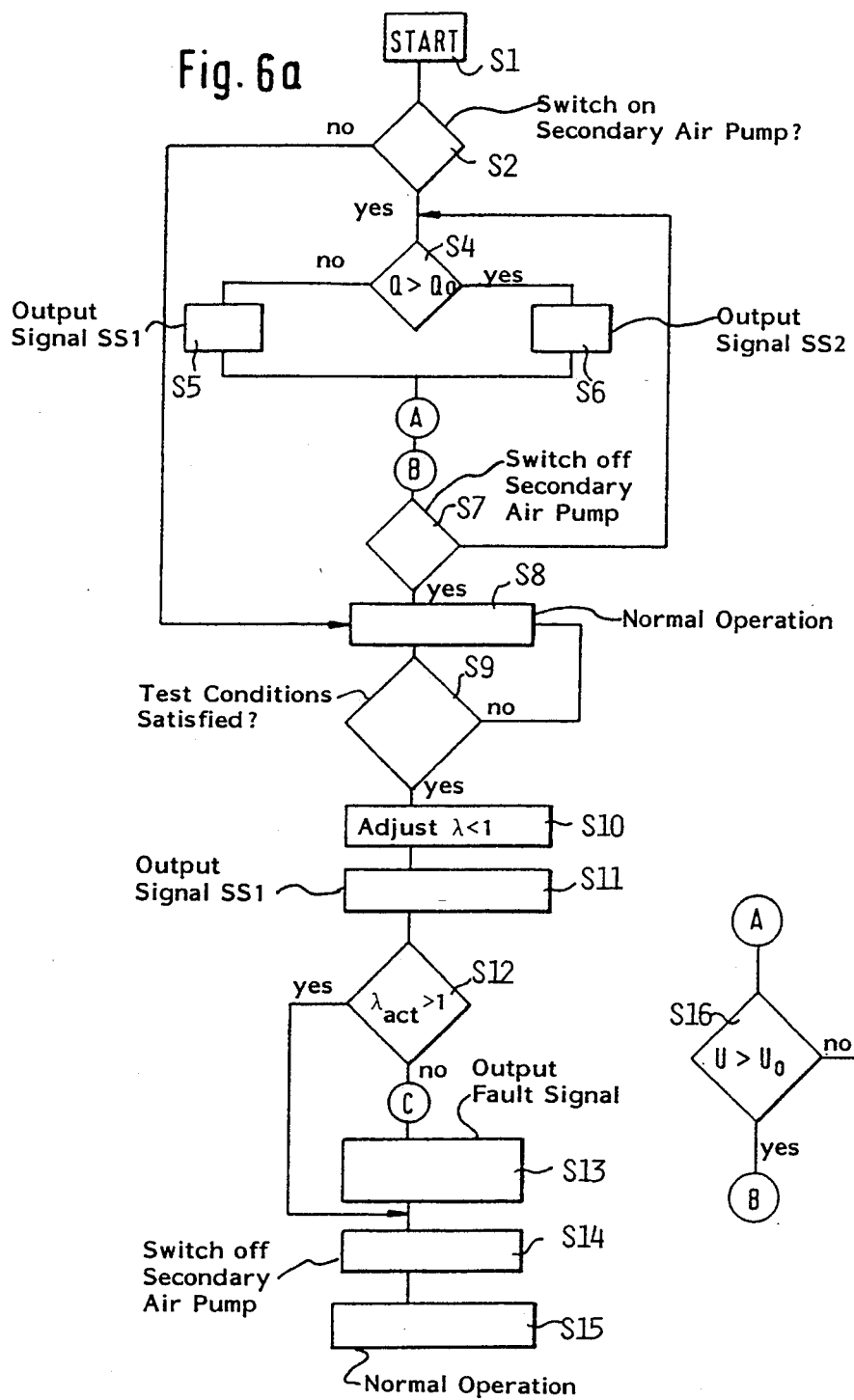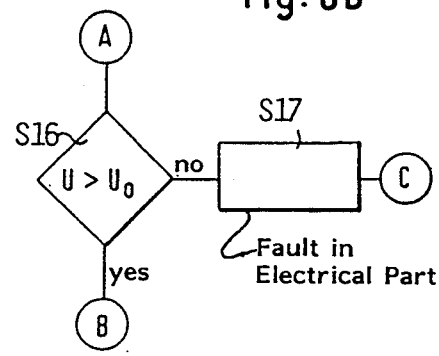

METHOD AND ARRANGEMENT FOR CONTROLLING THE SUPPLY OF SECONDARY AIR FOR AN INTERNAL COMBUSTION ENGINE

FIELD OF THE INVENTION

The invention relates to a method and an arrangement for adapting the quantity of the secondary air to the quantity of the exhaust gases exhausted by an internal combustion engine. In addition, the invention relates to a method and an arrangement for monitoring the supply of secondary air.

BACKGROUND OF THE INVENTION

It is already known to supply secondary air to the exhaust gas of an internal combustion engine after a cold start and when the lambda control is not yet operationally ready. The secondary air is blown in between the outlet valves of the engine and a catalytic converter. The exothermal reaction of the secondary air with the hot exhaust gases and the further oxidation in the catalytic converter lead to an accelerated heating of the catalytic converter and therefore to an improved conversion of toxic substances in the warm-up phase after a cold start of the engine. Such a system is disclosed in the article of Zahn et al entitled "The Emission Control System of the New 300SL-24 and 500SL—Structure and Function", published in the Motortechnische Zeitschrift 50 (1989), Volume 6, page 249. Statutory requirements furthermore provide for monitoring of the supply of secondary air. The California Environmental Authority (CARB) characterizes the quantity of secondary air as being critical for minimizing the emission of toxic substances in the case of a cold start. Here, and for monitoring the function, the suggestion is made that the supply of secondary air be activated briefly and that the reaction of the lambda control be evaluated. The supply of the secondary air during the diagnosis should be reduced in order to keep a possible deterioration of the conversion of toxic substances as small as possible. A reduction of the rpm of the secondary air pump is suggested for the case wherein the secondary air pumps are driven electrically.

SUMMARY OF THE INVENTION

It is an object of the invention to provide a simple method and a simple arrangement for driving an electric secondary air pump with advantageous exhaust-gas performance, excellent noise comfort and which can be easily monitored.

The method of the invention is for controlling the supply of secondary air to the exhaust gas of an internal combustion engine equipped with an electrically-driven secondary air pump. The method includes the step of driving the secondary air pump in at least two stages in dependence upon operating parameters of the engine so as to cause the supply of secondary air to be finely adapted to the actual value of the exhaust gas quantity outputted by the engine to a degree determined by the number of stages.

The method of the invention and the arrangement of the invention make it possible to at least coarsely adapt the quantity of secondary air to the quantity of exhaust gas whereby the following advantages are obtained: first, the condition is avoided wherein the conversion of toxic substances is affected by too great a quantity of secondary air in the case of diagnosis; and, second, a cooling down of the catalytic converter caused by too large a flow of secondary air in idle is avoided. At the same time, a minimum quantity of secondary air is supplied in other load ranges as it is needed for the accelerated warm-up of the catalytic converter. The pump noise is effectively reduced during the idle mode of operation of the engine wherein the pump noise, in some circumstances, is not covered by the engine noise. This advantage is especially effective when the diagnosis is carried out for a warm engine during idle, for example, at a stop for a traffic light.

BRIEF DESCRIPTION OF THE DRAWINGS

The invention will now be described with reference to the drawings wherein:

FIG. 3 shows a first embodiment of the arrangement of the invention for controlling and diagnosing the supply of secondary air;

FIG. 4 shows a second embodiment of the arrangement of the invention wherein a more differentiated diagnosis is possible as compared to the first embodiment;

DESCRIPTION OF THE PREFERRED EMBODIMENTS OF THE INVENTION

Figure 1:
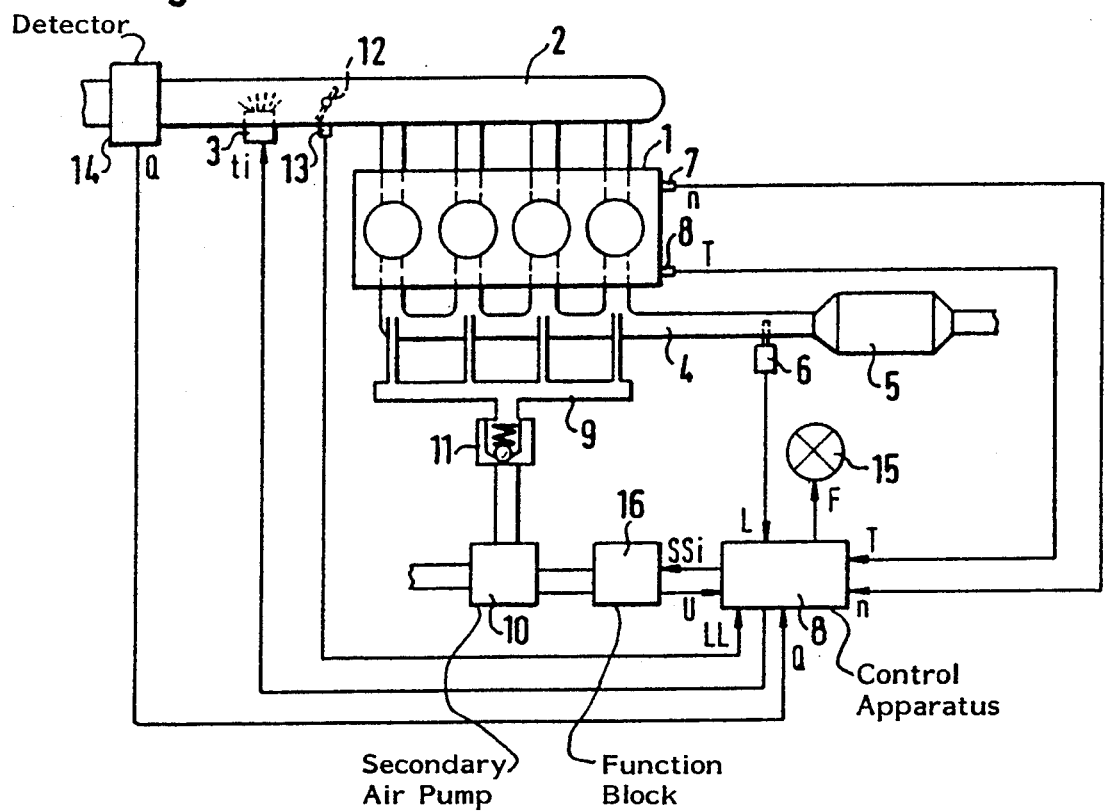
FIG. 1 is a schematic showing an internal combustion engine having a secondary air pump, a control apparatus as well as additional components and so shows the technical background in which the invention is applied.

In FIG. 1, reference numeral 1 identifies an internal combustion engine which includes an intake pipe 2, fuel-metering means 3, an exhaust-gas pipe 4 equipped with a catalytic converter 5 and an exhaust-gas probe 6, a sensor 7 for detecting the engine rpm (n) and a sensor 8 for detecting the temperature T of the engine. Also shown are: a control apparatus 8, lines 9 for the supply of secondary air into the exhaust-gas pipe 4, a secondary air pump 10, a check valve 11, a throttle flap 12 equipped with an idle contact 13, means 14 for detecting the air quantity Q drawn in by suction by the engine, means 15 for displaying or storing a signal which indicates a fault in the function of the supply of secondary air, and a function block 16 which contains the arrangement of the invention.

The control apparatus 8 receives at least the following signals: Q as to the quantity of the air inducted by suction, the engine rpm (n), the temperature T of the engine, the position of the throttle flap LL, the instantaneous fuel/air mixture composition λ as well as, for one embodiment of the invention, a measurement signal U from the function block 16. The control apparatus 8 forms a fuel-metering signal from a portion of these signals. The fuel-metering signal can, for example, be an injection time ti for driving the fuel-metering means 3. The fuel/air mixture formed in the intake pipe 2 is combusted in the engine 1. The residual oxygen component L of the exhaust gases of this combustion process is detected by the exhaust-gas probe 6. Toxic substances present in the exhaust gas are converted in the catalytic converter 5. Secondary air is supplied by the secondary air pump 10 to the exhaust gas of the engine in specific operating states.

The drive of the secondary air pump 10 takes place by the control apparatus 8 via the function block 16 explained below. For example, this drive can take place in dependence upon the signal LL as to the position of the throttle flap and additional signals as to load, rpm and temperature of the engine. If a fault in the supply of secondary air is detected when carrying out the diagnosis, the control apparatus emits a corresponding signal F to the means 15 which displays the fault or stores the occurrence of the fault for later inquiries. The check valve 11 prevents the exhaust gas from reaching the ambient via the secondary air pump.

Figure 2:
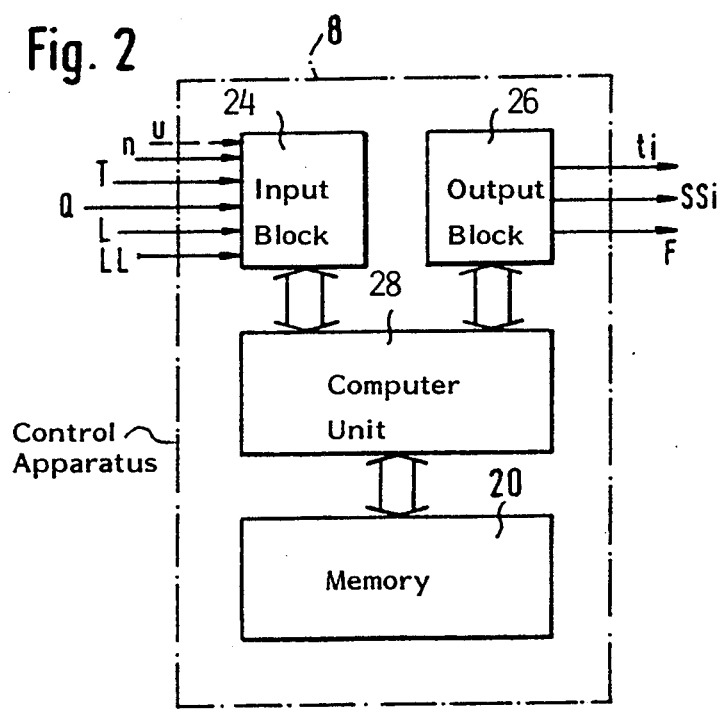
FIG. 2 is a schematic showing the configuration and operation of the control apparatus.

FIG. 2 shows a known control apparatus 8 in the form of function blocks. The signals (Q, T, L, LL, n) of the sensors of FIG. 1 as well as the signal U are supplied to an input block 24. The signal U occurs in one embodiment of the invention. An output block 26, for example, emits a fuel-metering signal ti, signals SSi, (i = 1, ..., n) for driving the secondary air pump and, if required, the fault signal F. A computer unit 28 performs processing between the two blocks in accordance with a program which can be stored in the memory 20. The memory 20 can also include data which can be used for the operation of the engine and this data can include, for example, characteristic fields for the injection times.

FIG. 3 is a first embodiment of the arrangement of the invention and shows the configuration of the function block 16 enclosed by a broken line together with the control apparatus 8, the secondary air pump 10 and the means 15. The function block 16 includes a resistor 19 as well as switching devices 17 and 18 which are operated alternatively to each other by the control apparatus 8 via signals SS1 and SS2. The formation of signals SSi takes place in dependence upon at least one of the input signals of the control apparatus 8 with the input signals being shown in FIG. 1.

A voltage is applied to the secondary air pump in dependence upon which of the two signals is emitted by the control apparatus 8. In the embodiment shown, the switching signal SS2 is emitted so that the full supply voltage is supplied to the secondary air pump when the switch 18 is closed and the switch 17 is open. Accordingly, a comparatively high quantity of secondary air is supplied to the exhaust gas of the engine in this switching position. Such a high quantity of secondary air is appropriate for comparatively high load and rpm values. In contrast, the switching signal SS1 is emitted for comparatively small loads and rpm values or when the throttle flap is closed, that is, during idle of the engine. In this case, the current supply of the secondary air pump is provided via the closed switch 17 and the series resistor 19. The supply voltage is dropped by means of the series resistor 19 and leads to a reduced pumping capacity of the secondary air pump 9.

Both switching means are actuated in dependence upon an operating point for a time span after engine start in order to accelerate warm-up of the catalytic converter. In this way, a two-stage adaptation of the quantity of secondary air to the exhaust-gas quantity takes place.

The operationally warm engine is first supplied with a rich mixture for diagnosing the supply of secondary air. Thereafter, the switch 17 is closed for a short time during idle. Insufflation of secondary air effects an increase of the oxygen component in the exhaust gas when operation is proper. The exhaust-gas probe 6 correspondingly indicates a lean mixture composition. An absence of this lean signal means that a fault is present in the area of the insufflation of the secondary air and a corresponding fault announcement is either stored or displayed (means 15).

A disadvantage of this simple embodiment is seen in that it is not possible to distinguish between faults in the electrical or mechanical portions of the secondary air supply. Furthermore, it is possible that faults in the second stage go unnoticed, for example, an absence of signal SS2 or a defective switch 18. These disadvantages are avoided with the embodiment of FIG. 4.

In the embodiment of FIG. 4, the function block 16 of FIG. 3 is supplemented by a further resistor 20 and means 21 which detects the voltage drop across resistor 20. This resistor is arranged in the common part of the two supply current loops for the secondary air pump. By measuring the voltage drop U at the resistor, the correct drive of the secondary air pump via signals SSi as well as the function of the individual current loops can be monitored during the regular operation of the secondary air pump. The monitoring of the pneumatic portion, that is, the actual insufflation into the exhaust gas flow takes place as above in idle via the reaction of the lambda controller.

Figure 5:
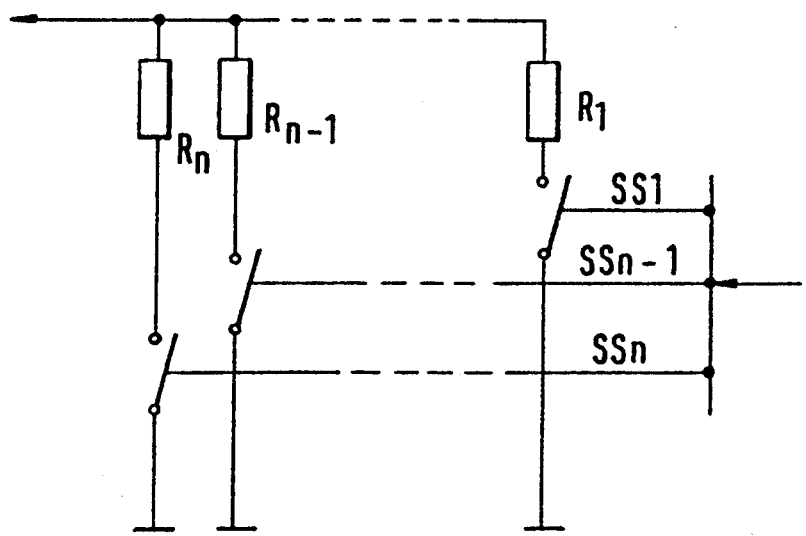
FIG. 5 shows still another embodiment of the arrangement of the invention expanded to a n-stage drive of the secondary air pump; and, FIGS. 6a and 6b are flowcharts showing the method of the invention as it can be carried out, for example, in the context of a program executed by the control apparatus.

FIG. 5 shows an expansion to a n-stage drive of the secondary air pump with resistors R1 to Rn, which, as explained in connection with the two-stage embodiment of FIG. 3, are switched into the current supply of the engine in dependence upon the operating point by control apparatus 8 via switching signals SSi.

FIG. 6 shows an embodiment of the method of the invention in the context of a flowchart containing method steps for carrying out the method of the invention. After a start of the engine in step S1, a check is made in step S2 as to whether certain conditions for the switch-in of the secondary air pump are satisfied. It can, for example, be advantageous to switch in the secondary air pump only below a specific intake air temperature and/or below a specific temperature of the cooling water. The inquiry in step S2 is answered in the negative if these values are exceeded and a normal operation of the engine follows via step S8 without the supply of the secondary air to the exhaust gas.

If, in contrast, the above-mentioned conditions are satisfied, then in step S4, the load quantity Q of the engine is compared to a threshold value Qo. If the threshold value is not exceeded as would be expected, for example, for a first inquiry after start, then the signal SS1 is emitted in step S5. As shown in FIG. 3, the signal SS1 closes the switch 17 in the current loop with the series resistor 19. Accordingly, a comparatively low voltage is applied to the secondary air pump which leads to a correspondingly low supply of secondary air to the exhaust gas. In contrast, exceeding the threshold value in step S4 leads via step S6 to outputting signal SS2, that is, to the operation of the secondary air pump without a series resistor and therefore to the supply of a comparatively high quantity of secondary air to the exhaust gas. A check is made in step S7 as to whether the secondary air pump should continue to remain switched on. For example, the secondary air pump can be switched off after reaching a time threshold or when the engine temperature exceeds a predetermined threshold value.

The loop comprising steps S4 to S7 is repeated as long as the switch-off condition is not satisfied. The secondary air quantity is adapted via steps S4 to S6 to the particular actual load value Q of the engine.

If in contrast, the switch-off conditions are satisfied, the program leaves the above-described loop in step S7 and branches in step S8 to normal operation of the engine without the supply of secondary air to the exhaust gas. This normal operation is maintained by a repeated pass-through of steps S8 and S9 until a determination is made in step S9 that specific test conditions are satisfied. A purposeful ancillary condition for carrying out the test is, for example, an idle state for an operationally-warm engine which has been present already for several seconds. The assumption is here made that this condition will continue for a time duration adequate to carry out the test. A typical example of such a situation is the delay time in which a motor vehicle stands at a traffic light. It is furthermore purposeful to carry out only one test per operating cycle in order to avoid carrying out the test at each traffic light stop and therefore an unnecessary number of times. If these test conditions are satisfied, then a rich mixture ($\lambda < 1$) is adjusted in a step S10. When the rich mixture becomes effective at the exhaust gas probe, then the signal SS1 is emitted for a short time in step S11 and the secondary air pump is thereby switched in via the series resistor at a reduced pumping capacity. For a proper operation of the secondary air supply, the exhaust gas probe must react with a signal change to the additionally introduced oxygen and must emit a lambda actual signal corresponding to a lean mixture composition ($\lambda > 1$). If this signal change is determined in step S12, then the components acting to supply secondary air are deemed to be operational. In this case, a return to normal operation takes place with step S15 after the secondary air pump is switched off in step S14. If the required signal change does not occur, then the inquiry in step S12 is answered in the negative and a fault signal is emitted in step S13 before the secondary air pump is switched off in step S14 and a return to normal operation takes place in step S15.

FIG. 6b shows an expansion of the method sequence described above which permits a more differentiated diagnosis in combination with the embodiment of FIG. 4. Thereafter, a check is made after mark A during operation of the secondary air pump, for example, even outside of the test routine (steps S9 to S16). This check determines whether the voltage U, which drops across the resistor 21 in FIG. 4, exceeds a threshold value Uo (S16). If this is not the case, then the current flow in the current supply of the secondary air pump is with great probability interrupted, for example, because of defective switches (17, 18) or because of the non-occurrence of signals SSi for closing these switches. In this way, a fault in the electrical portion of the secondary air supply can be detected and a correspondingly differentiated fault signal can be outputted to means 15 in step S17. Under these circumstances, the additional steps S7 to S13 are superfluous and the secondary air pump is switched off (S14) and there is a return to normal operation (S15) after a jump to the mark C.

If in contrast, the voltage drop U exceeds the threshold value Uo in inquiry step S12, then the electrical part of the secondary air supply is deemed to be operational and the steps S7 to S15, which have already been described, are carried out. If no signal change (S12) occurs, then a fault signal is outputted in step S13 which indicates a fault in the pneumatic portion of the secondary air supply.

In this way, the embodiment of FIG. 4 permits a fault announcement for differentiating between faults in the electrical and pneumatic parts of the secondary air supply.

It is understood that the foregoing description is that of the preferred embodiments of the invention and that various changes and modifications may be made thereto without departing from the spirit and scope of the invention as defined in the appended claims.

What is claimed is:

1. A method of controlling the supply of secondary air to the exhaust gas of an internal combustion engine equipped with an electrically-driven secondary air pump, the secondary air pump having a current supply containing resistors, the method comprising the steps of:

driving the secondary air pump in at least two stages in dependence upon operating parameters of the engine so as to cause the supply of secondary air to be finely adapted to the actual value of the exhaust gas quantity outputted by the engine to a degree determined by the number of said stages; and, switching resistors in said current supply.

2. A method of controlling the supply of secondary air to the exhaust gas of an internal combustion engine equipped with a secondary air supply which includes an electrically-driven secondary air pump, the method comprising the steps of:

driving the secondary air pump in at least two stages in dependence upon operating parameters of the engine so as to cause the supply of secondary air to be finely adapted to the actual value of the exhaust gas quantity outputted the engine to a degree determined by the number of said stages;

the secondary air supply further including a pneumatic part and supplying air for a comparatively small quantity of exhaust gas when driven in a first one of said stages; and, diagnosing said pneumatic part only when the engine is warm and only when said secondary air pump is driven in said first stage.

3. The method of claim 2, conducting said diagnosis in said pneumatic part of the secondary air supply only when the engine is running in idle.

4. A method of controlling the supply of secondary air to the exhaust gas of an internal combustion engine equipped with a secondary air supply which includes an electrically-driven secondary air pump and an electrical part, the method comprising the steps of:

driving the secondary air pump in at least two stages in dependence upon operating parameters of the engine so as to cause the supply of secondary air to be finely adapted to the actual value of the exhaust gas quantity outputted by the engine to a degree determined by the number of said stages; and, diagnosing said electrical part during normal operation of the secondary air pump when the engine is running warm after a cold start.

5. The method of claim 4, wherein the secondary air pump includes a supply current loop; and, wherein the method further comprises the step of determining if there is a flow of current in said supply current loop when the secondary air pump is switched on.

6. The method of claim 5, wherein the method comprises the following steps when a determination has been made that no current flows in said supply current loop outputting a signal which indicates that generally a defect in the secondary air supply or a defect in the electrical part of said secondary air supply is present; and, when the engine is warm, suppressing a test of said pneumatic part when said flow of current is not present.

7. An arrangement for controlling the supply of secondary air to the exhaust gas of an internal combustion engine equipped with an electrically-driven secondary air pump, the arrangement comprising:

a current supply circuit for supplying current to said secondary air pump;

said current supply circuit including:

current supply means for supplying current for driving said secondary air pump;

resistor means for reducing the current supplied to said secondary air pump; switching means switchable between a first position wherein said resistor means is switched into series with said secondary air pump to reduce said current supplied to said secondary air pump and a second position wherein said current is supplied to said secondary air pump without said resistor means being in series therewith; and, control means for emitting switching signals to said switching means in dependence upon the operating states of said engine.

8. The arrangement of claim 7, further comprising means for monitoring the flow of said current in said current supply circuit.

* * * * *

UNITED STATES PATENT AND TRADEMARK OFFICE
CERTIFICATE OF CORRECTION

PATENT NO. : 5,444,975

DATED : August 29, 1995

INVENTOR(S) : Jochen Göhre and Winfried Moser

It is certified that error appears in the above-identified patent and that said Letters Patent is hereby corrected as shown below:

In column 6, line 33: between "outputted" and "the", insert -- by --.

Signed and Sealed this

Twenty-third Day of January, 1996

*Attest:*

BRUCE LEHMAN

*Attesting Officer*     *Commissioner of Patents and Trademarks*